US010193487B2

(12) United States Patent
Yoshimura et al.

(10) Patent No.: US 10,193,487 B2
(45) Date of Patent: Jan. 29, 2019

(54) CONTROL DEVICE FOR POWER CONVERSION DEVICE, COMPRESSOR DRIVE SYSTEM, FLYWHEEL POWER GENERATING SYSTEM, AND CONTROL METHOD OF POWER CONVERSION DEVICE

(71) Applicant: Hitachi, Ltd., Chiyoda-ku, Tokyo (JP)

(72) Inventors: Masatoshi Yoshimura, Tokyo (JP); Mamoru Kimura, Tokyo (JP); Noriaki Hino, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/656,526

(22) Filed: Jul. 21, 2017

(65) Prior Publication Data
US 2018/0034402 A1    Feb. 1, 2018

(30) Foreign Application Priority Data

Aug. 1, 2016  (JP) ................................. 2016-151011

(51) Int. Cl.
| H02P 23/00 | (2016.01) |
| H02P 27/04 | (2016.01) |
| H02P 27/14 | (2006.01) |
| H02P 27/08 | (2006.01) |
| H02P 6/10  | (2006.01) |

(52) U.S. Cl.
CPC ............. *H02P 27/047* (2013.01); *H02P 6/10* (2013.01); *H02P 27/08* (2013.01); *H02P 27/14* (2013.01)

(58) Field of Classification Search
None
See application file for complete search history.

(56) References Cited

U.S. PATENT DOCUMENTS

| 5,184,057 A * | 2/1993 | Sakai ................... H02M 5/4585 |
| | | 318/801 |
| 2005/0163237 A1* | 7/2005 | Katanaya .......... H02M 7/53875 |
| | | 375/260 |
| 2013/0223115 A1* | 8/2013 | Tsuchiya ................. H02M 7/49 |
| | | 363/68 |

FOREIGN PATENT DOCUMENTS

| JP | 2006-204067 A | 8/2006 |
| JP | 2010-51129 A | 3/2010 |

* cited by examiner

*Primary Examiner* — Bentsu Ro
*Assistant Examiner* — Zemenay Truneh
(74) *Attorney, Agent, or Firm* — Crowell & Moring LLP

(57) ABSTRACT

There are provided a voltage command calculator that calculates a voltage command value that is a command value of an AC voltage to be applied to a rotary electric machine that is driven by a power conversion device, a carrier wave generator that generates a carrier wave, a comparator that generates a pulse signal to be supplied to the power conversion device on the basis of a comparison result between the voltage command value and the carrier wave, and a reset signal receiving unit that changes a value of the carrier wave into a predetermined value when a predetermined reset signal is input.

10 Claims, 11 Drawing Sheets

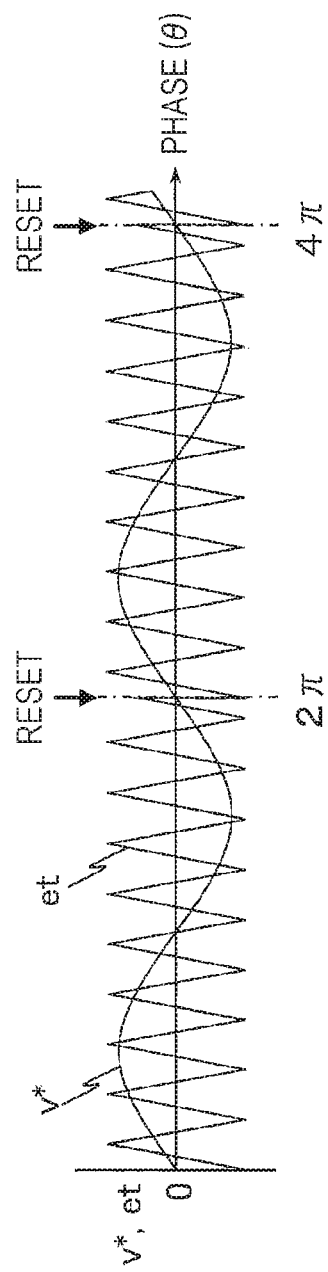
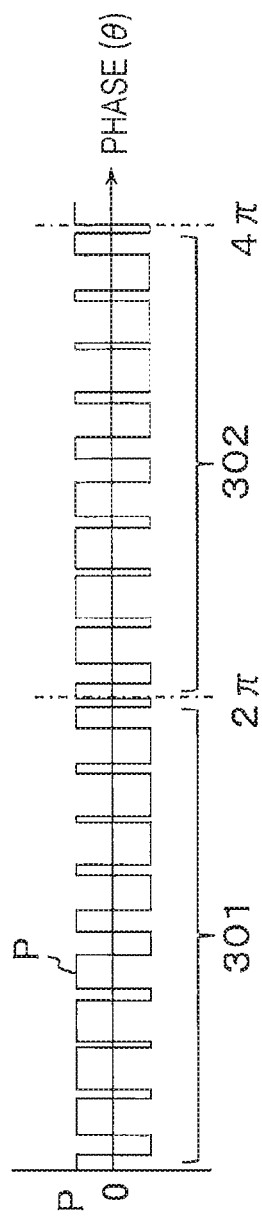

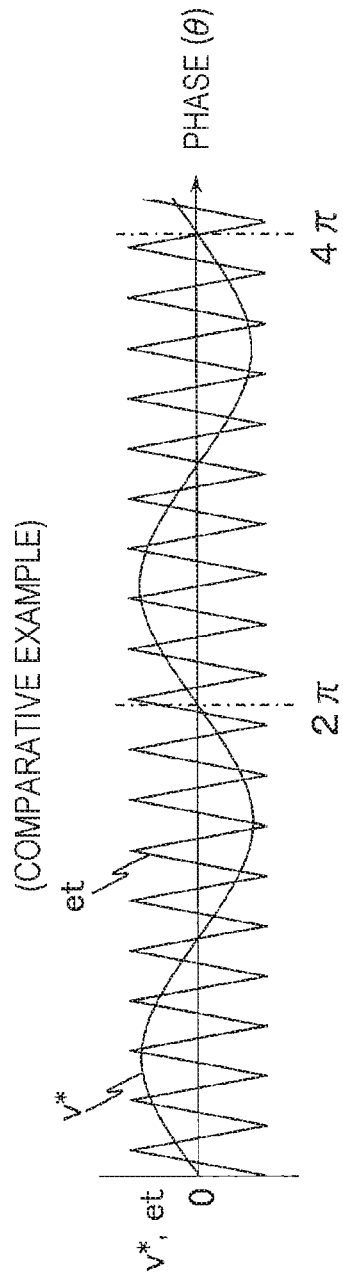
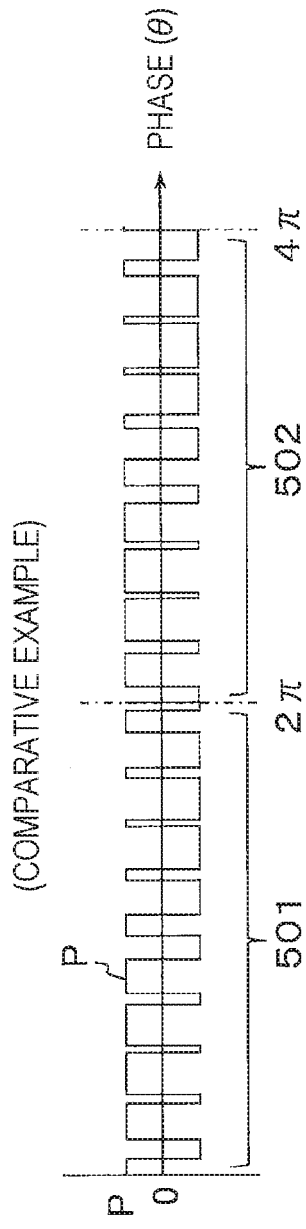

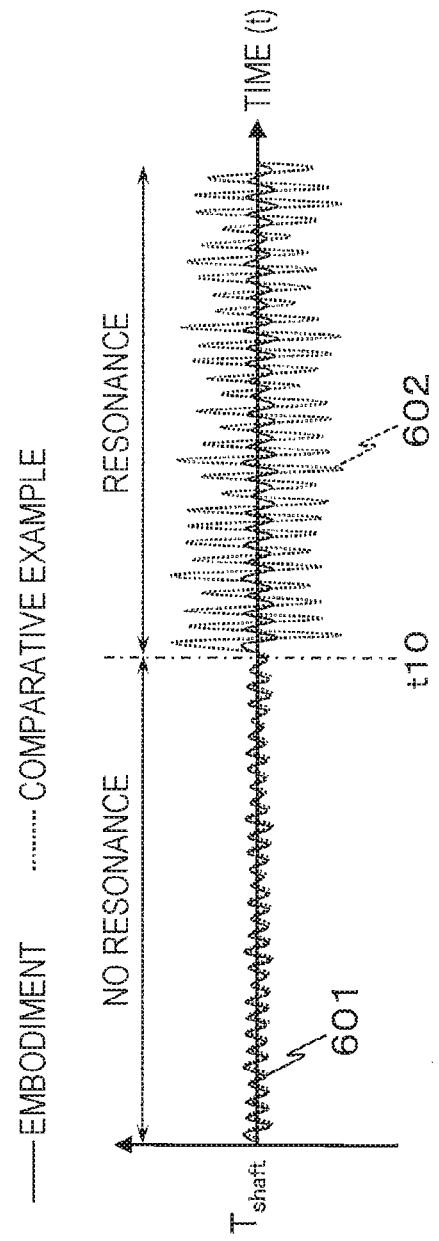

CONTROL DEVICE FOR POWER CONVERSION DEVICE, COMPRESSOR DRIVE SYSTEM, FLYWHEEL POWER GENERATING SYSTEM, AND CONTROL METHOD OF POWER CONVERSION DEVICE

CROSS-REFERENCE TO RELATED APPLICATION

This application claims the benefit of priority to Japanese Patent Application No. 2016-151011 filed 1 Aug. 2016, the disclosures of all of which are hereby incorporated by reference in their entireties.

TECHNICAL FIELD

The invention relates to a control device for a power conversion device, a compressor drive system, a flywheel power generating system, and a control method of the power conversion device.

BACKGROUND ART

Conventionally, a power conversion device such as an inverter which is able to convert DC power into AC power having an arbitrary frequency and voltage is widely used in a drive control of a rotary electric machine. The inverter turns on/off a semiconductor switching element on the basis of a voltage command value to output power having a desired frequency and voltage, and can control a rotation speed and a drive current of the rotary electric machine. In the control of the switching element of the inverter, PWM control is used in many cases to determine switching timing of the element using a pulse width modulation (PWM) signal.

As one of schemes of the PWM control, there is known an asynchronous PWM control in which a switching timing is determined by simply comparing a signal of the voltage command value with a signal of a carrier wave to generate a PWM pulse. In the scheme, the synchronization is generally not taken with respect to the frequency of the voltage command value since the frequency and the phase of the carrier wave are fixed.

In addition, as a technique other than the basic asynchronous PWM control described above, there are disclosed JP-2010-51129-A and JP-2006-204067-A.

In JP-2010-51129-A, there is an explanation "the synchronous PWM determiner 46 determines the number of times of synchronization in the synchronous PWM control, and the synchronous PWM phase controller 48 determines a frequency of a triangular carrier according to the number of times of synchronization, and determines timing of switching the number of times of synchronization. The PWM control unit 40 performs a synchronous PWM control in which the phase of the triangular carrier is synchronized with that of the voltage command." (see ABSTRACT)

In addition, in JP-2006-204067-A, "the inverter control circuit determines a phase of a sinusoidal reference signal using the phase determination unit 28, outputs a target current by performing a feedback control only on a positive period of the converted AC current waveform, stores the waveform output during the positive period immediately before the negative period in a storage unit 25, inverts and outputs the waveform, and makes a control such that the amplitudes of the currents output in the positive and negative periods become equal." (see ABSTRACT)

SUMMARY OF THE INVENTION

However, in the basic asynchronous PWM control described above, the symmetry is lost in the output voltage of the inverter at every cycle, and a torque pulsation becomes large.

In addition, there is a need to adjust a carrier wave frequency in the synchronous PWM control disclosed in JP-2010-51129-A. Therefore, responsiveness is lowered.

In addition, in the PWM control disclosed in JP-2006-204067-A, the feedback control is performed only when the AC current waveform is in the positive period. Therefore, the negative period is not subjected to the control, and the responsiveness of the current control system is lowered.

The invention has been made in view of the above situation, and an object thereof is to provide a control device for a power conversion device which has a small torque pulsation and a rapid response, a compressor drive system, a flywheel power generating system, and a control method of the power conversion device.

A control device for a power conversion device of the invention to solve the above problem includes a comparator which generates a pulse signal to be supplied to a power conversion device on the basis of a comparison result between a voltage command value and a carrier wave, and a reset signal receiving unit which changes a value of the carrier wave into a predetermined value when a predetermined reset signal is input.

According to the invention, it is possible to realize a control device for a power conversion device which has a small torque pulsation and a rapid response, a compressor drive system, a flywheel power generating system, and a control method of the power conversion device.

BRIEF DESCRIPTION OF THE DRAWINGS

FIG. 2 is a waveform diagram of a voltage command value and a carrier wave in the first embodiment;

FIG. 3 is a waveform diagram of a PWM signal in the first embodiment;

FIG. 4 is a waveform diagram of the voltage command value and the carrier wave in a comparative example;

FIG. 5 is a waveform diagram of the PWM signal in the comparative example;

FIG. 6 is a waveform diagram illustrating an example of an axial torsion torque which is generated in a rotation shaft of a rotary electric machine;

DESCRIPTION OF THE PREFERRED EMBODIMENTS

First Embodiment

<Configuration of First Embodiment>

Figure 1:
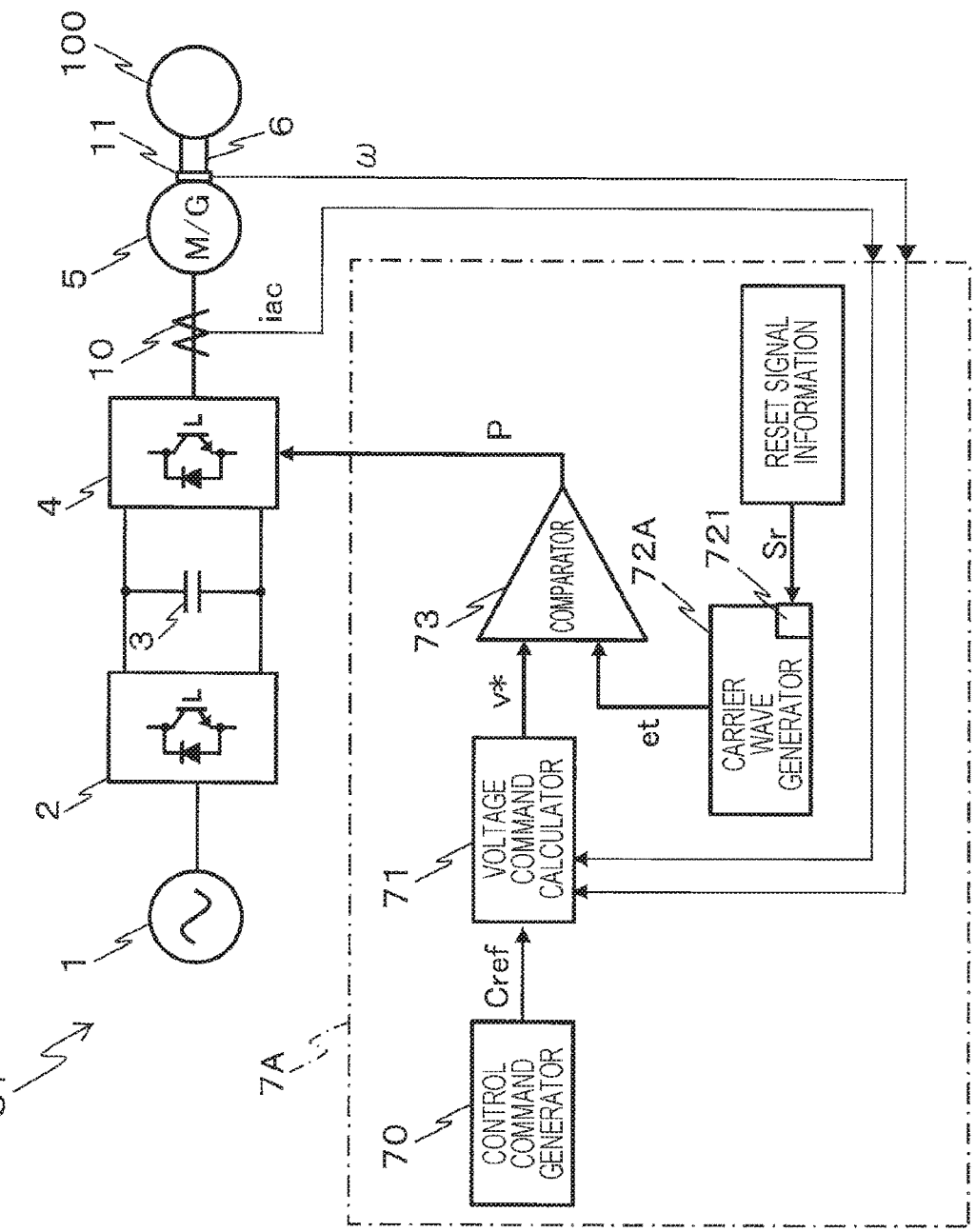
FIG. 1 is a block diagram of a rotary electric machine system according to a first embodiment of the invention.

FIG. 1 is a block diagram of a rotary electric machine system S1 according to a first embodiment of the invention.

The rotary electric machine system S1 includes an AC power source 1, a converter 2, a smoothing capacitor 3, an inverter 4 (power conversion device), a rotary electric machine 5, a rotation shaft 6, a control device 7A (a control device for the power conversion device), a current detecting sensor 10, a rotation speed detecting sensor 11, and a load 100.

The AC power source 1 is, for example, a commercial power source, and the converter 2 converts AC power output by the AC power source 1 into DC power. The smoothing capacitor 3 is charged and discharged with the DC power. The inverter 4 converts the DC power into three-phase AC power having an arbitrary frequency. The rotary electric machine 5 is, for example, an AC motor, and rotatably drives the load 100 through the rotation shaft 6 according to the AC voltage (power) supplied from the inverter 4.

In addition, the rotary electric machine 5 also serves as an electric generator, and can supply a regenerated power to the AC power source 1. In other words, the AC power regenerated in the rotary electric machine 5 is rectified by the inverter 4, and charges the smoothing capacitor 3. Then, the DC power charged in the smoothing capacitor 3 is converted into the AC power through the converter 2, and the AC power is supplied to the AC power source 1.

The current detecting sensor 10 detects a three-phase AC current flowing between the inverter 4 and the rotary electric machine 5, and outputs the detection result as a current signal iac. The rotation speed detecting sensor 11 detects a rotation speed of the rotary electric machine 5, and outputs the detection result as a speed signal ω. The control device 7A receives the current signal iac and the speed signal ω, and controls the converter 2 and the inverter 4.

The control device 7A includes hardware of a general computer such as a CPU (Central Processing Unit), a DSP (Digital Signal Processor), a RAM (Random Access Memory), and a ROM (Read Only Memory). The ROM stores a control program which is executed by the CPU, a micro program which is executed by the DSP, and various types of data. In FIG. 1, functions which are realized by the control program and the micro program are illustrated as blocks in the control device 7A. Further, hardware configurations of control devices 7B to 7F to be applied to the other embodiments described below are also the same as that of the control device 7A.

In FIG. 1, the control device 7A includes a control command generator 70, a voltage command calculator 71, a carrier wave generator 72A, and a comparator 73.

The control command generator 70 generates and outputs a control command Cref which is a reference for the inverter 4 to convert a DC voltage (power) into a three-phase AC voltage. The control command Cref is, for example, a speed command or a torque command. The voltage command calculator 71 outputs a voltage command value v* on the basis of the current signal iac supplied from the current detecting sensor 10 and the speed signal ω supplied from the rotation speed detecting sensor 11, and the control command Cref. Herein, the voltage command value v* is a general term of voltage command values vu*, vv*, and vw* (not illustrated) of U, V, and W phases.

The carrier wave generator 72A outputs a carrier wave et. Herein, the carrier wave et is, for example, a triangular wave as illustrated in FIG. 2. However, the waveform of the carrier wave et is not necessarily to be the triangular wave, and may be other waveforms such as a sawtooth wave as long as it can be compared with the voltage command value v*, The carrier wave generator 72A includes a reset signal receiving unit 721. When receiving predetermined reset signal information Sr (reset signal), the reset signal receiving unit 721 changes (resets) the value of the carrier wave et to a predetermined value, and changes (resets) the phase to a predetermined phase.

The comparator 73 compares the voltage command value v* (in more detail, each of the voltage command values vu*, vv*, and vw*) with the carrier wave et, and outputs a PWM signal P (pulse signal) on the basis of a magnitude relation thereof. The PWM signal P is a general term of PWM signals Pu, Pv, and Pw (not illustrated) of U, V, and W phases.

<Operation of First Embodiment>

Next, the operation of this embodiment will be described.

FIG. 2 illustrates an example of a waveform diagram of the voltage command value v* and the carrier wave et in this embodiment. In addition, FIG. 3 illustrates a waveform diagram of the PWM signal P which is output on the basis of the magnitude relation between the voltage command value v* and the carrier wave et. However, in practice, the voltage command value v* in FIG. 2 is any one of the voltage command values vu*, vv*, and vw* of the U, V, and W phases, and the PWM signal. P in FIG. 3 is also any one of the PWM signals Pu, Pv, and Pw of the U, V, and W phases.

The voltage command value v* illustrated in FIG. 2 is a sinusoidal waveform in a period of two cycles (0 to 4π), and the carrier wave et is a triangular wave. The frequency of the voltage command value v* is set to $f_1$, the frequency of the carrier wave et is set to $f_c$, and a ratio ($f_c/f_1$) of the two is set to n1. In the example of FIG. 2, the ratio n1 is not an integer, but the ratio n1 is a relatively small value (about 9.5). In addition, the comparator 73 (see FIG. 1) outputs the PWM signal P which becomes a positive value when "v*>et", and becomes a negative value when "v*≤et", Therefore, the waveform of the PWM signal P is formed as illustrated in FIG. 3.

As described above, the value of the carrier wave et is changed to a predetermined value when the carrier wave generator 72A receives the reset signal information Sr. In the example of FIG. 2, the value of the carrier wave et is changed to a negative minimum value at every timing when the voltage command value v* is greater than zero (that is, at every timing according to the frequency $f_1$ of the voltage command value v*). Therefore, since the carrier wave et comes to be the same phase relation with the voltage command value v*, an output pulse P illustrated in FIG. 3 has a high symmetry between a period 301 of 0 to 2π (first cycle) and the next period 302 of 2π to 4π (second cycle). Therefore, even in a case where the ratio n1 is not an integer, it is possible to suppress that a sideband wave generated at a frequency $f_b$ in the following Equation (1) occurs in the torque of the rotary electric machine.

$$f_b = m \cdot f_c \pm n \cdot f_1 \qquad \text{Equation (1)}$$

Herein, m and n are integers.

As can be seen from Equation (1), frequency components lower than the frequency $f_1$ of the voltage command value v* are contained in the sideband wave. The low frequency components mainly cause a resonance in a drive system (the rotary electric machine 5, the rotation shaft 6, and the load 100).

Further, as described above, each waveform illustrated in FIGS. 2 and 3 is practically any one of the U, V, and W phases. When these waveforms are the U-phase waveform, the voltage command value, the carrier wave et, and the output pulse P of the V and W phases (not illustrated) are waveforms delayed by $2\pi/3$ and $4\pi/3$ phases respectively with respect to the U phase. Since the V-phase and W-phase waveforms are the same as that of the U phase except the phase differences $2\pi/3$ and $4\pi/3$ with respect to the U phase, these waveforms are omitted in the drawing.

By the way, an asynchronous PWM control is generally easy to be assembled into a part of a closed loop control system, and a rapid responsive system can be realized. Then, in a case where a rapid responsive speed control and an output control are performed while suppressing a torque pulsation in the asynchronous PWM control, it is considered that the ratio n1 ($=f_c/f_1$) is desirably set to be equal to or more than about 14 to 15. As described above, FIGS. 2 and 3 illustrate an example in which the ratio n1 is about 9.5, and the reason will be described.

First, assuming a small/intermediate capacity system, a heat loss caused by a switching element of the power conversion device is small, so that a carrier wave frequency $f_c$ can be easily set to be high, and the ratio n1 can be set to be sufficiently large. However, in a device necessarily using a large-capacity power conversion device such as a roller drive, a railway vehicle, and a reactive power compensation device, a high-speed switching (that is, setting the carrier wave frequency $f_c$) is unfavorable in the viewpoint of heat loss. More specifically, in order to set the carrier wave frequency $f_c$ high, a cooling device of the switching element is advanced in performance and the power conversion device itself is increased in size. In addition, since a switching loss is increased as the carrier wave frequency $f_c$ is increased, a conversion efficiency is also degraded. Therefore, the example in which the ratio n1 is about 9.5 is employed in FIGS. 2 and 3 as an example which is reasonable to a large-capacity power conversion device in practice.

Comparative Example

Next, the configuration and the operation of a comparative example will be described in order to elucidate the effect of this embodiment.

The configuration of this comparative example is the same as that (FIG. 1) of this embodiment except that the reset signal receiving unit 721 is not provided.

FIG. 4 is a waveform diagram of the voltage command value v* and the carrier wave et in the comparative example, and FIG. 5 is a waveform diagram of the PWM signal P in the comparative example. In FIGS. 4 and 5, the ratio n1 ($=f_c/f_1$) is about 9.5 similarly to FIGS. 2 and 3.

The waveform of the voltage command value v* illustrated in FIG. 4 is similar to that of FIG. 2. However, the waveform of the carrier wave et is different from that of FIG. 2, and no reset occurs. In other words, the same shape of triangular waveform is repeatedly formed over two cycles (0 to $4\pi$) of the voltage command value v* in the carrier wave et. Therefore, the waveform of the PWM signal P is made as illustrated in FIG. 5. As illustrated in FIG. 5, in a case where the ratio n1 is not an integer multiple of "3", the voltage command value v* and the carrier wave et do not become the same phase relation at every cycle of the frequency $f_1$.

Therefore, comparing a period 501 of 0 to $2\pi$ (first cycle) and the next period 502 of $2\pi$ to $4\pi$ (second cycle) of the PWM signal P illustrated in FIG. 5, it can be seen that the width, position, and number of pulses are different.

Therefore, compared with the case of this embodiment illustrated in FIG. 3, the PWM signal P in the comparative example has a low symmetry in waveform at every cycle. For this reason, the sideband wave generated at the frequency $f_b$ on the basis of the above Equation (1) cannot be ignored, the pulsation of the output current caused by the sideband wave is increased, and thus a torque pulsation of the rotary electric machine 5 (see FIG. 1) becomes large.

FIG. 6 is a waveform diagram illustrating an example of an axial torsion torque Tshaft(t) which is generated in the rotation shaft 6 (see FIG. 1) of the rotary electric machine 5. A broken line 602 indicates a characteristic of the comparative example, and a solid line 601 indicates a characteristic of this embodiment. As described above, the torque pulsation caused by the sideband wave of the frequency $f_b$ is generated in the rotary electric machine 5. In addition, there is a natural frequency in a drive system which includes the rotary electric machine 5, the rotation shaft 6, and the load 100. In FIG. 6, there is no resonance between the frequency $f_b$ of the sideband wave and the natural frequency of the drive system before time t10, and the resonance occurs in both frequencies after time t10.

According to the comparative example, when the resonance occurs, it can be seen that a variable amplitude of the axial torsion torque Tshaft(t) becomes large. On the other hand, according to this embodiment, the variable amplitude of the axial torsion torque Tshaft(t) can be suppressed to be less even at the time of resonance in order to suppress the sideband wave from being generated. Therefore, it is possible to suppress a torsional vibration which is generated by the axial torsion torque.

<Effect of First Embodiment>

As described above, according to this embodiment, the reset signal information Sr is generated in synchronization with the cycle of the voltage command value v*, and the value of the carrier wave et is changed into a predetermined value in synchronization with the cycle of the voltage command value v*. Therefore, the sideband wave can be suppressed without degrading the responsiveness of the control system, and the torque pulsation can also be suppressed. Furthermore, even in a case where the resonance occurs between the frequency $f_b$ of the sideband wave and the natural frequency of the drive system, the torsional vibration can be suppressed.

Second Embodiment

Next, the description will be given about a rotary electric machine system according to a second embodiment of the invention.

Figure 7:
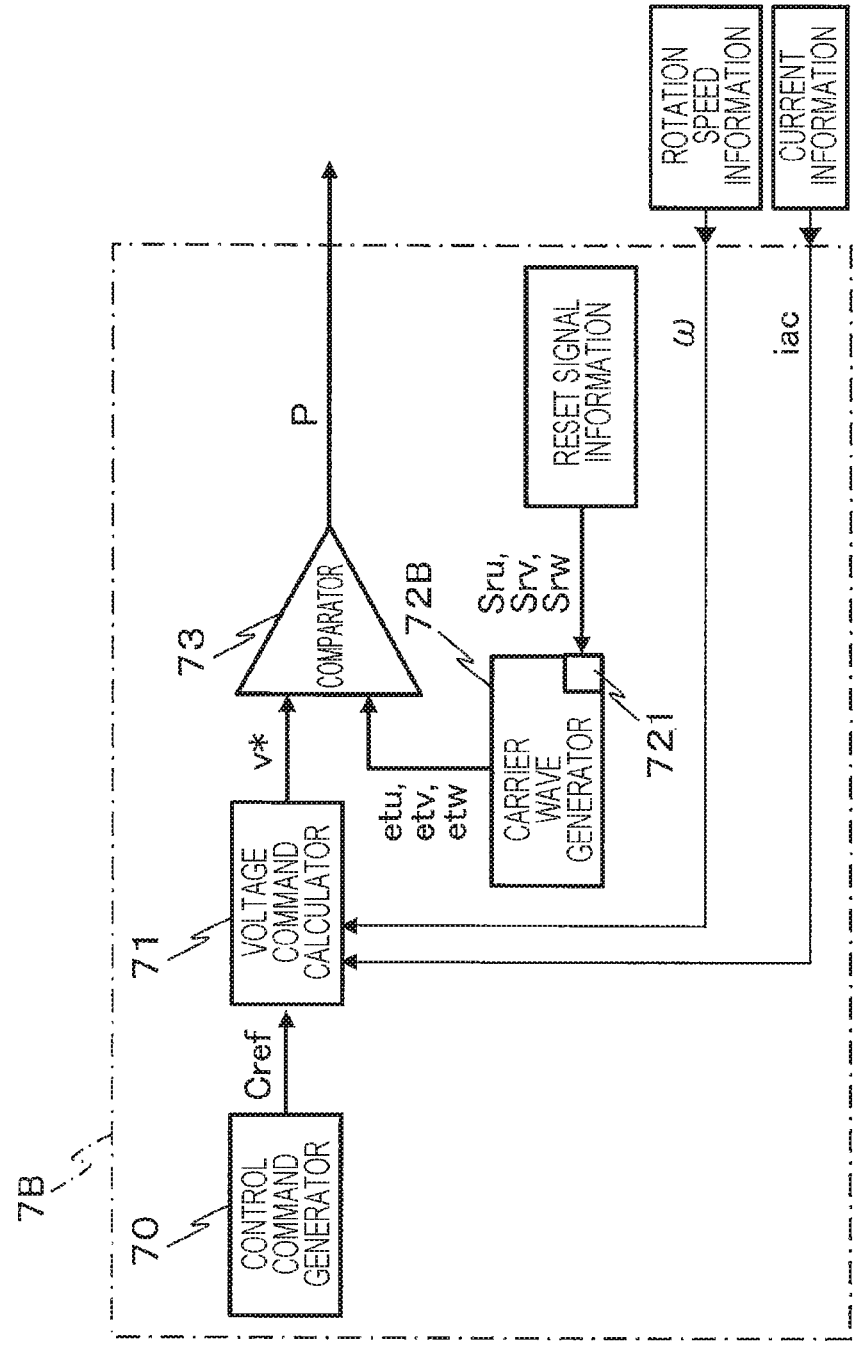
FIG. 7 is a block diagram of a control device which is applied to a second embodiment.

The configuration of the rotary electric machine system of this embodiment is similar to that of the first embodiment (see FIG. 1) except that the control device 7B (the control device for the power conversion device) illustrated in FIG. 7 is applied in place of the control device 7A.

FIG. 7 is a block diagram of the control device 7B which is applied to this embodiment. The control device 7B is in common with the control device 7A of the first embodiment in that the control command generator 70, the voltage command calculator 71, and the comparator 73 are provided except that a carrier wave generator 72B is provided in place of the carrier wave generator 72A of the first embodiment.

The carrier wave generator 72B outputs 3-system carrier waves etu, etv, and etw respectively corresponding to the U, V, and W phases. Further, the carrier wave generator receives 3-system reset signal information Sru, Srv, and Srw (reset signals) corresponding to these carrier waves, and resets the corresponding carrier waves etu, etv, and etw. The comparator 73 compares the voltage command value v* (that is, the voltage command values vu*, vv*, and vw*) with the corresponding carrier waves etu, etv, and etw, and outputs the PWM signal P (that is, Pu, Pv, and Pw) on the basis of the comparison result.

As described above, the carrier wave generator 72B in this embodiment changes the values of the three-phase carrier waves etu, etv, and etw into predetermined values at different timing on the basis of the three-phase reset signal information Sru, Srv, and Srw different in phase by ⅓ cycle of the voltage command value v*. Therefore, the symmetry between the phases of the PWM signals Pu, Pv, and Pw can be increased still more than that of the first embodiment, and the sideband wave can be effectively reduced further more. Further, the carrier wave generator 72B has been described to receive the 3-system reset signal information Sru, Srv, and Srw. However, alternatively, only one system may be received among the reset signal information Sru, Srv, and Srw, and the other 2-system reset signal information may be generated by shifting the phase by 2π/3 respectively.

Third Embodiment

Next, the description will be given about a rotary electric machine system according to a third embodiment of the invention.

Figure 8:
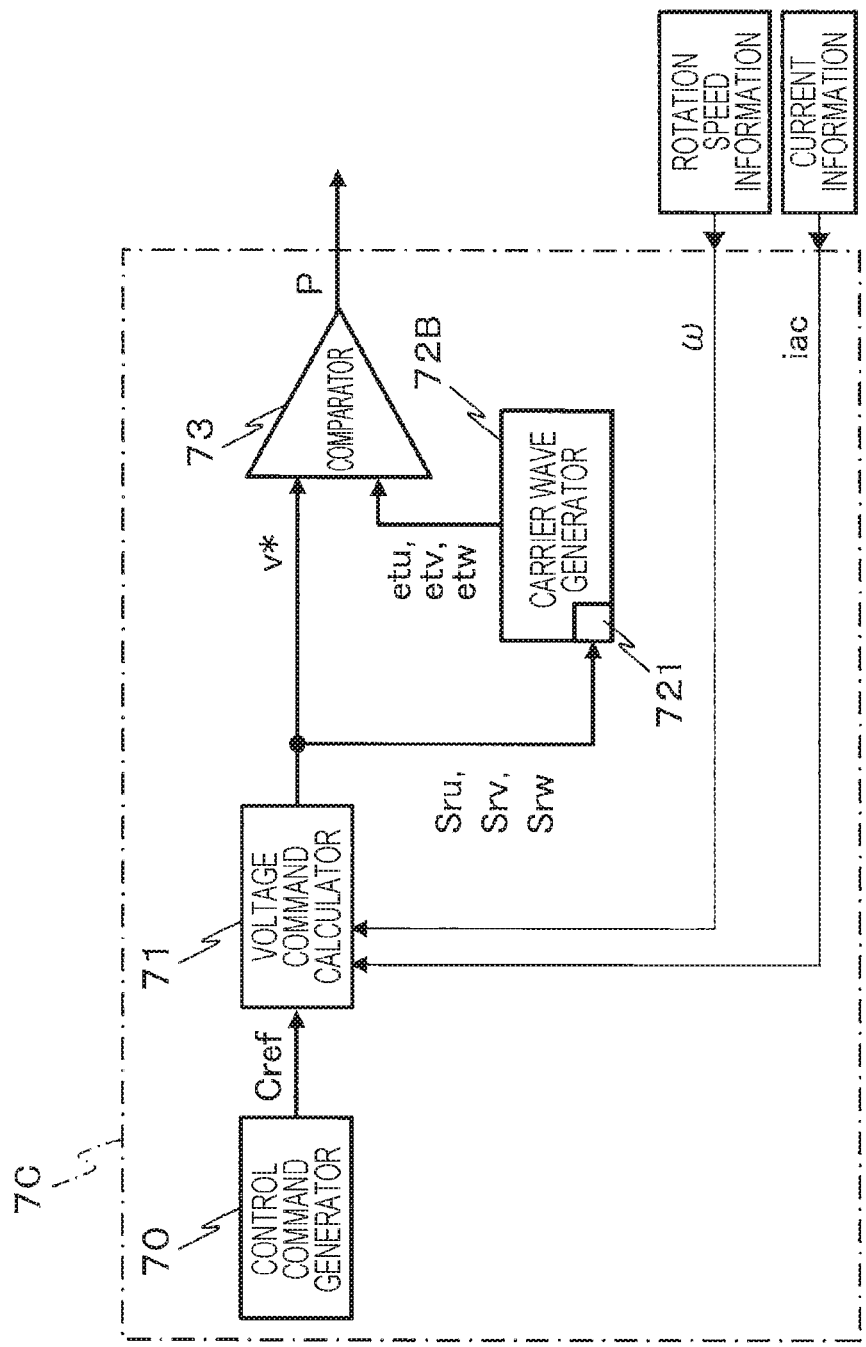
FIG. 8 is a block diagram of a control device which is applied to a third embodiment.

The configuration of the rotary electric machine system of this embodiment is similar to that of the first embodiment (see FIG. 1) except that the control device 7C (the control device for the power conversion device) illustrated in FIG. 8 is applied in place of the control device 7A.

FIG. 8 is a block diagram of the control device 7C which is applied to this embodiment. The control device 7C is in common with the control device 7B of the second embodiment in that the control command generator 70, the voltage command calculator 71, the comparator 73, and the carrier wave generator 72B are provided. However, the control device 7C of this embodiment is different in that the voltage command value v* (that is, vu*, vv*, and vw*) output from the voltage command calculator 71 is supplied to the reset signal receiving unit 721.

The reset signal receiving unit 721 of this embodiment changes (resets) the corresponding carrier waves etu, etv, and etw into predetermined values at timing when any one of the voltage command values vu*, vv*, and vw* is changed in an increasing or decreasing direction to pass a predetermined value (for example, zero). In the reset operation, it is possible to take synchronization at every cycle between sine waves of the voltage command values vu*, vv*, and vw* at every one cycle and the carrier waves etu, etv, and etw output from the carrier wave generator 72B.

As described above, according to this embodiment, the reset signal receiving unit 721 receives the three-phase voltage command values vu*, vv*, and vw* as the three-phase reset signal information Sru, Srv, and Srw, and changes the values of the corresponding three-phase carrier waves etu, etv, and etw into predetermined values when the values of the three-phase voltage command values vu*, vv*, and vw* are changed in the increasing or decreasing direction to pass a predetermined value. Therefore, according to this embodiment, there is no need to add a calculator for creating the reset signal information, so that the configuration of the control device 7C can be simplified as that much.

Fourth Embodiment

Next, the description will be given about a rotary electric machine system according to a fourth embodiment of the invention.

Figure 9:
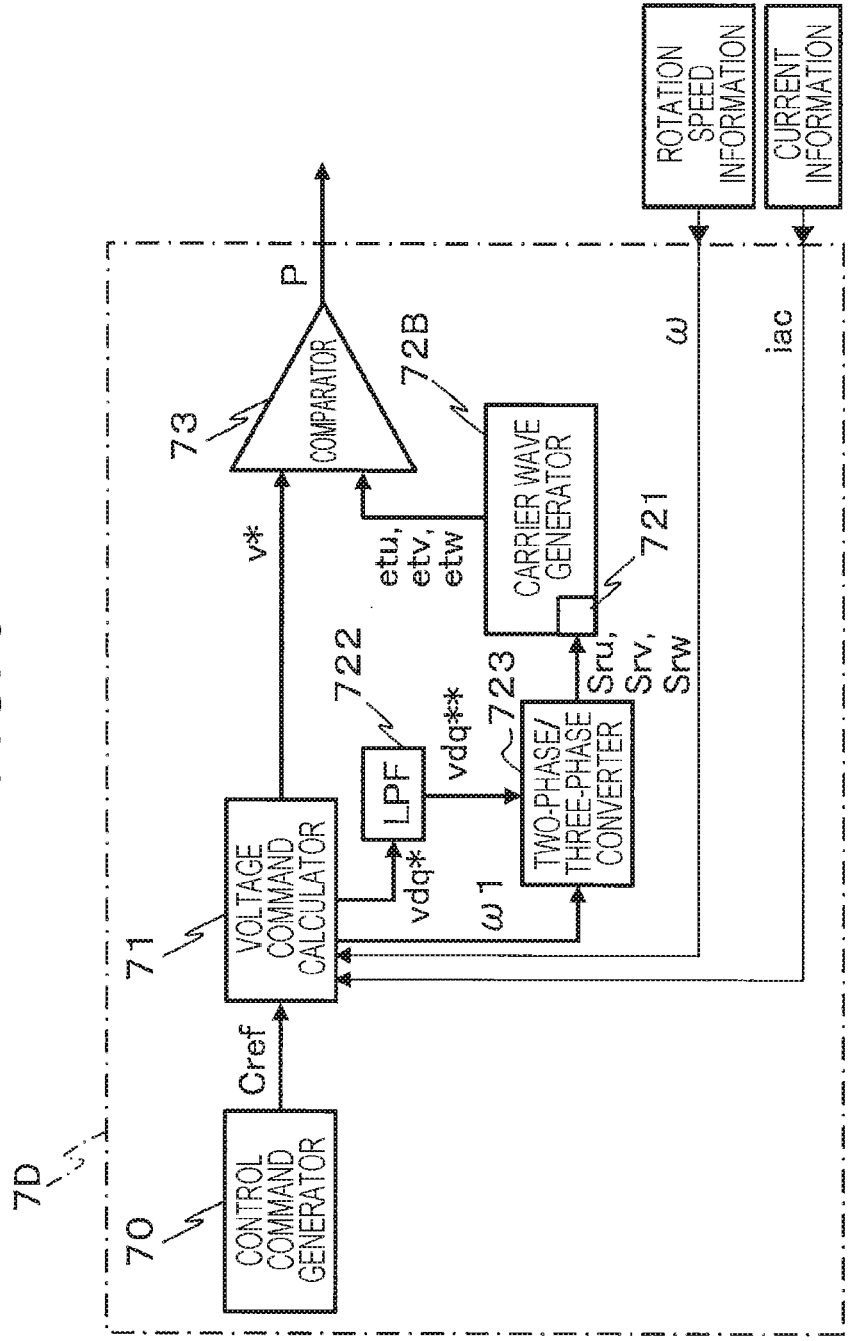
FIG. 9 is a block diagram of a control device which is applied to a fourth embodiment.

The configuration of the rotary electric machine system of this embodiment is similar to that of the first embodiment (see FIG. 1) except that the control device 7D (the control device for the power conversion device) illustrated in FIG. 9 is applied in place of the control device 7A.

FIG. 9 is a block diagram of the control device 7D which is applied to this embodiment. The control device 7D is in common with the control device 7B of the second embodiment in that the control command generator 70, the voltage command calculator 71, the comparator 73, and the carrier wave generator 72B are provided. However, the control device 7D of this embodiment further includes an LPF (low pass filter) 722 and a two-phase/three-phase converter 723.

A rotary coordinate system is assumed which rotates at a speed of Q times a machine angle when the number of pole pairs of the rotary electric machine 5 is set to "Q". In the rotary coordinate system, an axis in a direction of main magnetic flux of the rotary electric machine 5 is called a d axis, and the axis perpendicular to the d axis is called a q axis. The voltage command calculator 71 outputs voltage command values vd* and vq* of the d and q axes. Further, both the voltage command values vd* and vq* are collectively called a voltage command value vdq* (DC voltage command value). In addition, the voltage command calculator 71 outputs also a speed command value ω1 to comma id the speed of the rotary electric machine 5.

The LPF 722 suppresses a variation component of the voltage command value vdq*, and outputs the result as a voltage command value vdq. The two-phase/three-phase converter 723 integrates the speed command value ω1 and outputs an angle command value θ1 (not illustrated). Then, the two-phase/three-phase converter 723 generates the three-phase voltage command values of the U, V, and W phases on the basis of the voltage command value vdq and the angle command value θ1, and outputs these values as the three-phase reset signal information Sru, Srv, and Srw.

The reset signal receiving unit 721 changes (resets) the corresponding carrier waves etu, etv, and etw into predetermined values at timing when any one of the three-phase voltage command values is changed in the increasing or decreasing direction to pass a predetermined value (for example, zero). Further, in the example of the drawing, the two-phase/three-phase converter 723 has been described to generate the angle command value θ1 on the basis of the speed command value ω1, but the voltage command calculator 71 may be configured to supply the angle command value θ1 to the two-phase/three-phase converter 723.

As described above, according to this embodiment, the voltage command calculator 71 generates the voltage command value vdq* in the rotary coordinate system which rotates in synchronization with the rotation of the rotary electric machine 5, and the two-phase/three-phase converter 723 outputs the three-phase voltage command values on the basis of the output signal of the LPF 722 to which the voltage command value vdq* is input. Then, the reset signal receiving unit 721 changes the values of the three-phase carrier waves etu, etv, and etw into predetermined values using the three-phase voltage command values as the three-phase reset signal information Sru, Srv, and Srw.

Therefore, according to this embodiment, a signal noise component and a variation component which are overlapped with the voltage command value vdq* are suppressed, and an error in timing for the reset signal receiving unit 721 to reset the carrier waves etu, etv, and etw to the predetermined values can be reduced.

Fifth Embodiment

Next, the description will be given about a rotary electric machine system according to a fifth embodiment of the invention.

Figure 10:
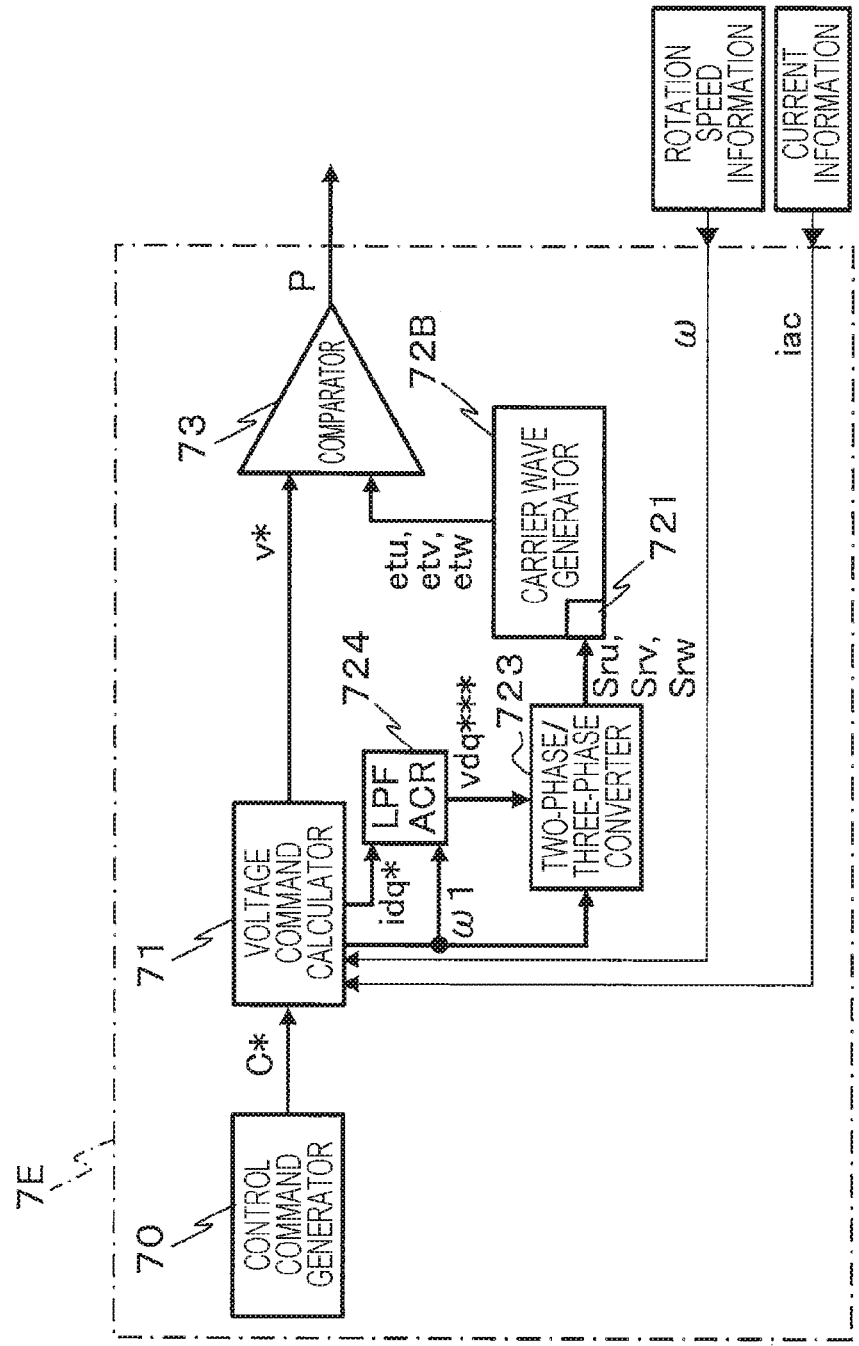
FIG. 10 is a block diagram of a control device which is applied to a fifth embodiment.

The configuration of the rotary electric machine system of this embodiment is similar to that of the first embodiment (see FIG. 1) except that the control device 7E (the control device for the power conversion device) illustrated in FIG. 10 is applied in place of the control device 7A.

FIG. 10 is a block diagram of the control device 7E which is applied to this embodiment. The control device 7E includes the control command generator 70, the voltage command calculator 1, the comparator 73, the carrier wave generator 72B, and the two-phase/three-phase converter 723 similarly to the control device 7D of the fourth embodiment (see FIG. 9).

However, the control device 7E of this embodiment includes an LPFACR 724 (low-pass-filter attached current controller) in place of the LPF 722 in the control device 71D. The voltage command calculator 71 outputs current command values id* and iq* of the d and q axes. Further, both the current command values id* and iq* are collectively called a current command value idq* (DC command value), in addition, the voltage command calculator 71 outputs also a speed command value ω1 to command the speed of the rotary electric machine 5.

While not illustrated in the drawing, the LPFACR, 724 includes an ACR (current controller) and an LPF (low pass filter). Herein, the LPF is supplied with the current command value idq*. The LPF has a time constant equal to a time constant (a time constant until the current command value idq* is reflected to the current flowing to the rotary electric machine 5 after being output by the voltage command calculator 71) of the current control system.

In addition, the ACR calculates a difference between the output signal of the LPF and the current command value idq*, and performs a proportional calculation and an integration calculation with respect to the difference so as to obtain a voltage command value vdq*. Therefore, the LPFACR 724 generates a voltage command values vdq* of the DC two-phase. Then, the two-phase/three-phase converter 723 generates the three-phase voltage command values of the U, V, and W phases on the basis of the voltage command value vdq* and the speed command value ω1, and outputs these values as the three-phase reset signal information Sru, Srv, and Srw. The reset signal receiving unit 721** changes (resets) the corresponding carrier waves etu, etv, and etw into predetermined values at timing when any one of the three-phase voltage command values is changed in the increasing or decreasing direction to pass a predetermined value (for example, zero).

As described above, the voltage command calculator 71 in this embodiment generates the current command value idq* in the rotary coordinate system which rotates in synchronization with the rotation of the rotary electric machine 5, the LPFACR 724 outputs the voltage command value vdq*** on the basis of the output signal of the LPF equipped therein and the current command value idq*, and the two-phase/three-phase converter 723 outputs the three-phase voltage command values on the basis of the voltage command value vdq*. The reset signal receiving unit 721 changes the values of the three-phase carrier waves etu, etv, and etw into predetermined values using the three-phase voltage command values as the reset signal information Sru, Srv, and Srw. Therefore, according to this embodiment, it is possible to suppress an influence caused by the signal noise component and the variation component which are contained in the actual current signal iac. Therefore, the reset signal receiving unit 721** can reduce an error in timing for resetting the carrier waves etu, etv, and etw.

Sixth Embodiment

Next, the description will be given about a rotary electric machine system S6 according to a sixth embodiment of the invention.

Figure 11:
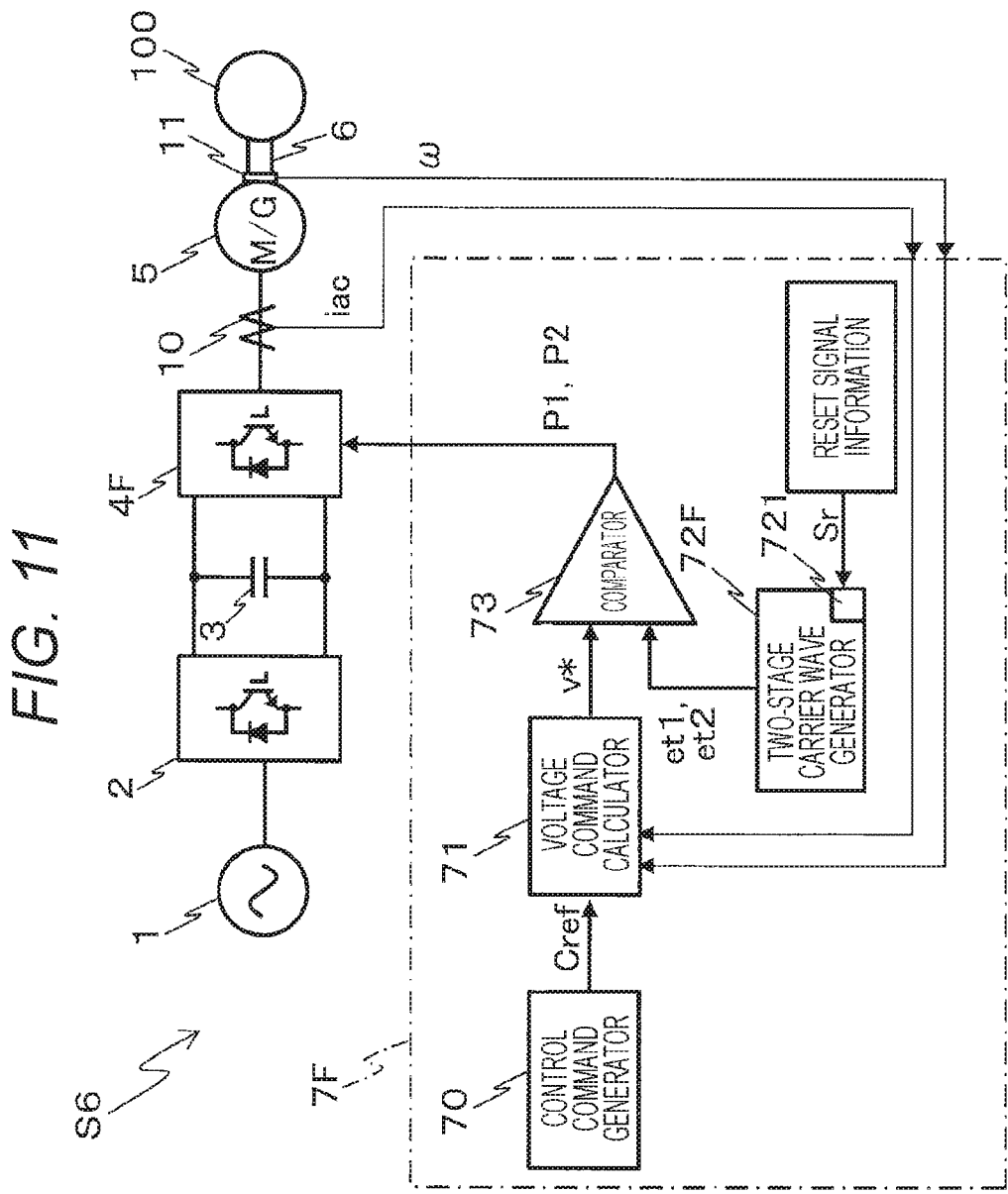
FIG. 11 is a block diagram of a rotary electric machine system according to a sixth embodiment.

FIG. 11 is a block diagram of the rotary electric machine system S6 according to the sixth embodiment.

The rotary electric machine system S6 includes the AC power source 1, the converter 2, the smoothing capacitor 3, the rotary electric machine 5, the rotation shaft 6, the current detecting sensor 10, the rotation speed detecting sensor 11, and the load 100 similarly to the rotary electric machine system S1 of the first embodiment (see FIG. 1).

In addition, the rotary electric machine system SG includes a power conversion device 4F and a control device 7F (the control device for the power conversion device) in place of the inverter 4 and the control device 7A of the rotary electric machine system S1 of the first embodiment. The power conversion device 4F is a 3-level power conversion device which outputs a 3-level voltage. In addition, the control device 7F includes the control command generator 70, the voltage command calculator 71, and the comparator 73 similarly to the control device 7A of the first embodiment. However, the control device 7F includes a carrier wave generator 72F in place of the carrier wave generator 72A in the control device 7A.

The carrier wave generator 72F generates 2-system carrier waves et1 (first carrier wave) and et2 (second carrier wave), and supplies the waves to the comparator 73. The comparator 73 outputs PWM signals P1 and P2 (pulse signals) on the basis of a magnitude relation of the voltage command value v* and the carrier waves et1 and et2. In other words, the PWM signal P1 becomes a positive value when "v*>et1", and becomes a negative value when "v*≤et1". In addition, the PWM signal P2 becomes a positive value when "v*<et2", and becomes a negative value when "v*≥et2".

Figure 12:
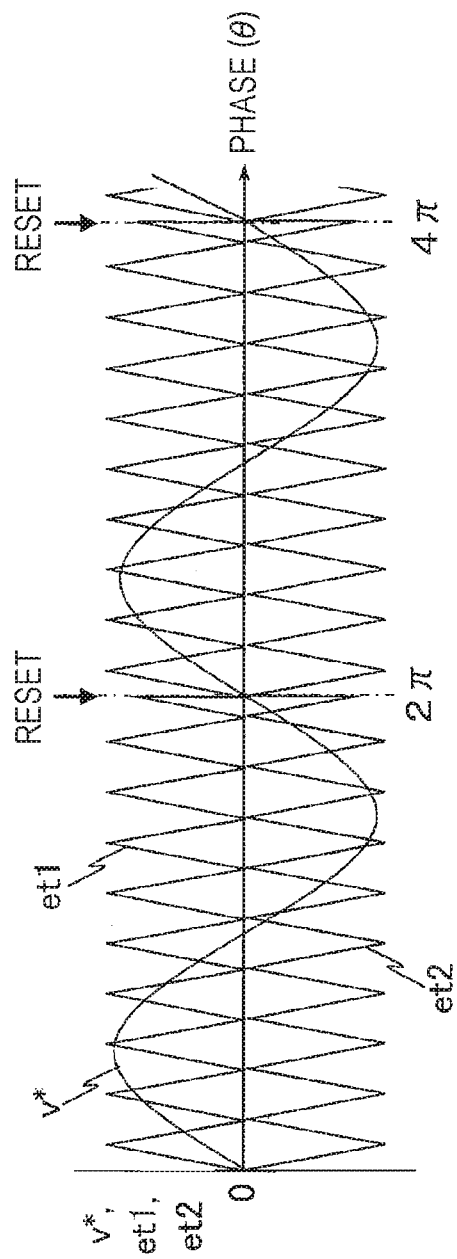
FIG. 12 is a waveform diagram of the voltage command value and the carrier wave in the sixth embodiment.

FIG. 12 is a waveform diagram illustrating an example of the voltage command value v* and the carrier waves et1 and et2. As illustrated in FIG. 12, the carrier waves et1 and et2 is a triangular wave having the same amplitude and the same frequency. However, while the carrier wave et1 has zero as a minimum value, the carrier wave et2 has zero as a maximum value. In addition, the phases of the carrier waves et1 and et2 are shifted half the cycle of the carrier wave. In addition, the values of the carrier waves et1 and et2 are reset to predetermined values (both are zero in the example of the drawing) at every one cycle of the voltage command value v*.

As described above, according to this embodiment, the power conversion device 4F is a 3-level power conversion device, and the carrier wave generator 72F generates the first and second carrier waves et1 and et2 which have the common carrier wave frequency $f_c$. Therefore, the first and second carrier waves et1 and et2 have a phase difference by the half cycle of the carrier wave frequency $f_c$. Then, when the reset signal information Sr is input, the reset signal receiving unit 721 changes the first carrier wave et1 into a first value (zero value), and changes the second carrier wave et2 into a second value (zero value). In this way, according to this embodiment, the values of the carrier waves et1 and et2 are reset at every one cycle of the voltage command value v*, so that the symmetry of the output pulse P is improved. Therefore, it is possible to suppress the sideband wave and the torque pulsation of the rotary electric machine 5 generated near the frequency of the rotation speed and suppress a torsional vibration.

Seventh Embodiment

Next, the description will be given about a compressor drive system S7 according to a seventh embodiment of the invention.

Figure 13:
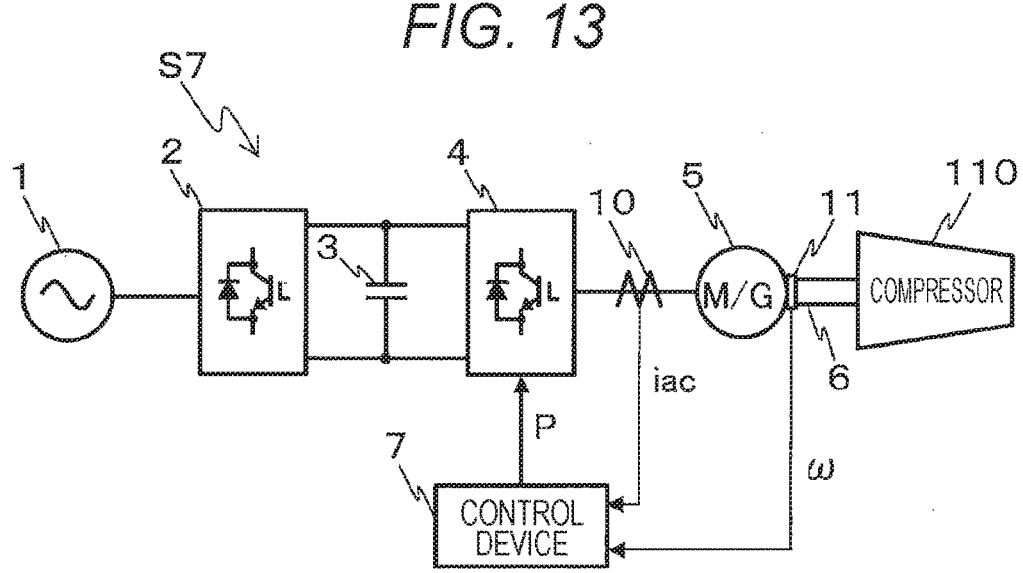
FIG. 13 is a block diagram of a rotary electric machine system according to a seventh embodiment.

FIG. 13 is a block diagram of a compressor drive system S7 according to the seventh embodiment.

The compressor drive system S7 includes the AC power source 1, the converter 2, the smoothing capacitor 3, the inverter 4, the rotary electric machine 5, the rotation shaft 6, the current detecting sensor 10, and the rotation speed detecting sensor 11 similarly to the rotary electric machine system S1 of the first embodiment (see FIG. 1). In addition, a compressor 110 is provided in place of the load 100 (see FIG. 1). Any one of the control devices 7A to 7E of the first to fifth embodiments can be applied to the control device 7 in the drawing. In addition, in a case where the 3-level power conversion device 4F illustrated in FIG. 11 (the sixth embodiment) is applied in place of the inverter 4, the 3-level control device 7F illustrated in the drawing can be applied.

The compressor 110 is driven by the rotary electric machine 5 through the rotation shaft 6. In general, since the compressor 110 is changed in its load torque according to a rotation angle, a high speed control having a rapid response speed is desirable. In addition, it is desirable to achieve high stability in a variable speed operation where the vibration of the rotation shaft 6 caused by the natural frequency of the drive system is small.

In this embodiment, the control devices 7A to 7F in the first to fifth embodiments are applied as the control device 7. Therefore, it is possible to realize the compressor drive system S7 which has high stability in control of a high response speed (that is, a high speed control) and in which the vibration caused by the natural frequency of the drive system is suppressed.

Eighth Embodiment

Next, the description will be given about a flywheel power generating system S8 according to an eighth embodiment of the invention.

Figure 14:
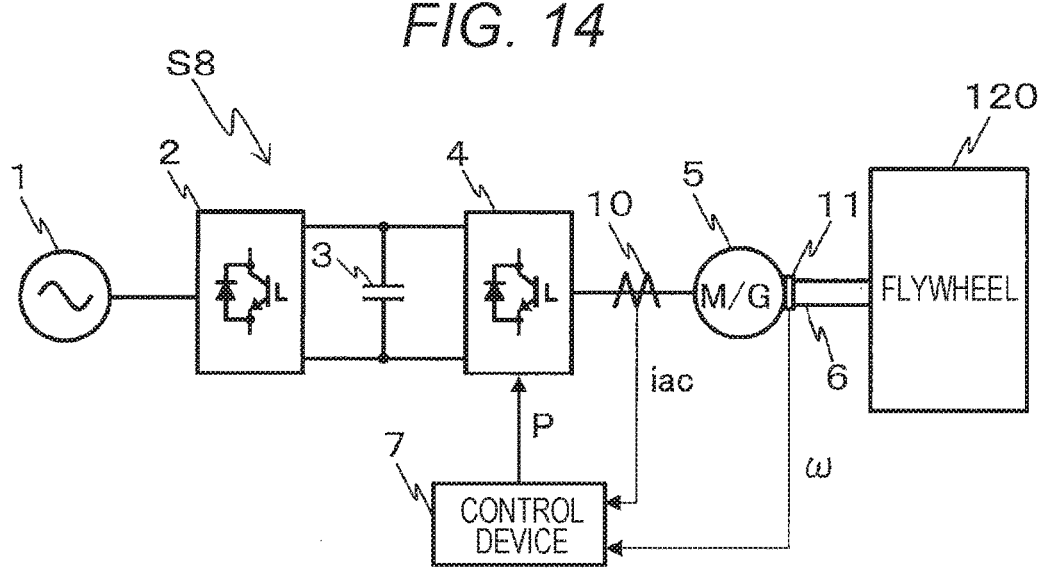
FIG. 14 is a block diagram of a flywheel power generating system according to an eighth embodiment.

FIG. 14 is a block diagram of the flywheel power generating system S8 according to the eighth embodiment.

The flywheel power generating system S8 includes the AC power source 1, the converter 2, the smoothing capacitor 3, the inverter 4, the rotary electric machine 5, the rotation shaft 6, the current detecting sensor 10, and the rotation speed detecting sensor 11 similarly to the rotary electric machine system S1 of the first embodiment (see FIG. 1).

Any one of the control devices 7A to 7E of the first to fifth embodiments can be applied to the control device 7 in the drawing. In addition, in a case where the 3-level power conversion device 4F illustrated in FIG. 11 (the sixth embodiment) is applied in place of the inverter 4, the 3-level control device 7F illustrated in the drawing can be applied.

A flywheel 120 in FIG. 14 is driven by the rotary electric machine 5 through the rotation shaft 6, and has inertial energy for storing or generating power. The flywheel 120 may have other functions besides storing or generating the power.

When the power is supplied from the AC power source 1 to the rotary electric machine 5 through the converter 2, the smoothing capacitor 3, and the inverter 4, the flywheel 120 is rotatably driven, and the inertial energy is stored in the flywheel 120. In addition, when the rotary electric machine 5 is rotatably driven by the rotation of the flywheel 120, the energy is supplied from the rotary electric machine 5 to the AC power source 1 through the inverter 4, the smoothing capacitor 3, and the converter 2.

Herein, with the torque or rotation speed control of the rotary electric machine 5, the rotation shaft 6 vibrates at the natural frequency of the drive system which includes the rotary electric machine 5, the rotation shaft 6, and the flywheel 120. When the vibration becomes large in amplitude, the flywheel power generating system S8 stops, or the rotation shaft 6 may be broken. It is desirable to suppress the vibration of the drive system in order to prevent such a situation.

In addition, in a case where the response speed of the control is late, the input/output speed of the power becomes late. Therefore, it is desirable to make the response speed of the control fast.

The flywheel power generating system S8 of this embodiment employs the control devices (7A to 7F) for the power conversion device of the first to sixth embodiments as the control device 7 to satisfy the above requirements. Therefore, it is possible to suppress the vibration caused by the natural frequency of the drive system and to control the input/output of the AC power with respect to the AC power source 1 with high responsiveness, so that high reliability and responsiveness can be realized in the flywheel power generating system S8.

Modifications

The invention is not limited to the above embodiments, and various modifications can be made. The embodiments are given as examples in a clearly understandable way for the invention, and thus the invention is not necessarily to provide all the configurations described above. In addition, some configurations of a certain embodiment may be replaced with the configurations of another embodiment, and the configuration of the other embodiment may also be added to the configuration of a certain embodiment. Furthermore, omission of some configurations of each embodiment, or additions and substitutions may be made using other configurations. In addition, control lines and information in the drawings are illustrated for the sake of explanation, and it does not mean that all the control lines and information lines necessary for manufacturing a product are illustrated. In practice, it may be considered that almost all of the configurations are connected to one another. For example, there are feasible modifications with respect to the above embodiments as follows.

(1) In the above embodiments, the DC power to be supplied to the inverter 4 or the power conversion device 4F is generated by the AC power source 1, the converter 2, and the smoothing capacitor 3. However, other DC power sources such as a battery may be employed in place of these components.

(2) The waveform of the carrier wave et illustrated in FIG. 2 is reset at timing when the voltage command value v* is greater than zero, and the value after resetting becomes a negative minimum value. However, timing for resetting the carrier wave et is not limited to the timing when the voltage command value v* is greater than zero, but other timing may be employed. In addition, the value of the carrier wave et after resetting is also not limited to a negative minimum value, and other values may be employed. Similarly, timing for resetting the carrier waves et1 and et2 illustrated in FIG. 12 is also not limited to the timing when the voltage command value v* is greater than zero. The values of the carrier waves et1 and et2 after resetting are also not limited to zero, and other values may be employed. In addition, the values of the carrier waves et1 and et2 after resetting may be other values.

(3) The control devices 7A to 7E in the first to fifth embodiments are aimed at the 2-level inverter 4, and the control device 7F in the sixth embodiment is aimed at the 3-level power conversion device 4F. However, a 4-level or more power conversion device and the corresponding control device may be applied in place of these devices.

(4) In the above embodiments, the speed signal ω is detected using the rotation speed detecting sensor 11. However, the speed signal ω may be estimated without sensors. For example, the speed signal ω1 may be estimated on the basis of the current signal iac detected by the current detecting sensor 10 and the speed command value ω1 estimated by the voltage command calculator 71.

(5) In the above embodiments, the frequencies (the carrier wave frequency $f_c$) of the carrier waves et, etu, etv, etw, et1, and et2 generated by the carrier wave generators 72A, 72B, and 72F are constant. However, the carrier wave frequency may vary to be an integer multiple of the frequency $f_1$ of the voltage command value v* (more desirably, odd times of "3"). In general, the carrier wave frequency $f_c$ is steeply changed in a synchronized PWM control. However, the carrier wave frequency $f_c$ is slowly changed in the above embodiments. The reason is because the carrier waves et, etu, etv, etw, et1, and et2 are reset in synchronization with the voltage command value v* even in the middle of changing the carrier wave frequency $f_c$, so that the torque pulsation of the rotary electric machine 5 can be suppressed.

(6) Since the hardware of the control devices 7A to 7F in the above embodiments may be realized using a general computer, programs for realizing the operations in the above embodiments may be stored in a storage medium or distributed via a transmission line.

(7) In addition, the inner blocks of the control devices 7A to 7F in the above embodiments have been described as software processes using programs, but some or all of the blocks may be replaced with hardware processes using an ASIC (Application Specific Integrated Circuit) or an FPGA (field-programmable gate array).

(8) In addition, the control devices 7A to 7F of the first to sixth embodiments may be applied to various electric machines such as a refrigerator, a construction machine, an industrial machine, an electric automobile, a railway vehicle, a vessel, and an elevator besides the compressor drive system S7 of the seventh embodiment and the flywheel power generating system S8 of the eighth embodiment. With such a configuration, these electric machines may exert excellent performance according to applications.

What is claimed is:

1. A control device for a power conversion device, comprising:
   a voltage command calculator that calculates a voltage command value, the voltage command value being a command value of an AC voltage to be applied to a rotary electric machine that is driven by a power conversion device;
   a carrier wave generator that generates a carrier wave;
   a comparator that generates a pulse signal to be supplied to the power conversion device on the basis of a comparison result between the voltage command value and the carrier wave; and
   a reset signal receiving unit that changes a value of the carrier wave into a predetermined value when a predetermined reset signal is input;
   wherein the AC voltage is a three-phase AC voltage, and
   wherein the carrier wave generator changes each of the carrier waves of three phases into the predetermined value at different timing on the basis of the reset signals of three phases, each of which is different in phase by ⅓ cycle of the voltage command value.

2. The control device for the power conversion device according to claim 1,
   wherein the reset signal is generated in synchronization with a cycle of the voltage command value, and
   wherein the value of the carrier wave is changed into the predetermined value in synchronization with the cycle of the voltage command value.

3. The control device for the power conversion device according to claim 2, further comprising:
   a control command generator that outputs a control command to control the power conversion device,
   wherein the voltage command calculator outputs the voltage command value on the basis of a current signal corresponding to an output current of the power conversion device, a speed signal corresponding to a rotation speed of the rotary electric machine, and the control command.

4. The control device for the power conversion device according to claim 1,
   wherein the voltage command value is a three-phase voltage command value, and
   wherein the reset signal receiving unit receives the voltage command values of three phases as the reset signals of three phases, and changes the corresponding carrier waves of three phases into predetermined values when the voltage command values of the three phases are changed in an increasing or decreasing direction to pass the predetermined values.

5. The control device for the power conversion device according to claim 1,
   wherein the voltage command calculator generates a DC voltage command value in a rotary coordinate system that rotates in synchronization with rotation of the rotary electric machine,
   the control device, further comprising:
   a low pass filter to which the DC voltage command value is input; and
   a two-phase/three-phase converter that outputs the voltage command values of three phases on the basis of an output signal of the low pass filter,
   wherein the reset signal receiving unit changes each of values of the carrier waves of three phases into the predetermined value using the voltage command values of three phases as the reset signals.

6. The control device for the power conversion device according to claim 1,
   wherein the voltage command calculator generates a DC command value in a rotary coordinate system that rotates in synchronization with rotation of the rotary electric machine, the control device, further comprising:
a low-pass-filter attached current controller that includes a low pass filter to which the DC current command value is input, and a current controller that outputs a DC voltage command value on the basis of an output signal of the low pass filter and the DC current command value; and
a two-phase/three-phase converter that outputs the voltage command values of three phases on the basis of the DC voltage command value,
wherein the reset signal receiving unit changes each of values of the carrier waves of three phases into the predetermined value using the voltage command values of three phases as the reset signals.

7. A compressor drive system, comprising:
the control device for the power conversion device according to claim 1;
the power conversion device; and
a compressor that is driven by the rotary electric machine.

8. A flywheel power generating system, comprising:
the control device for the power conversion device according to claim 1;
the power conversion device; and
a flywheel that is driven by the rotary electric machine and regenerates power through the rotary electric machine.

9. The control device for the power conversion device according to claim 1,
wherein the power conversion device is a 3-level power conversion device,
wherein the carrier wave generator generates first and second carrier waves having a common carrier wave frequency,
wherein the first and second carrier waves are different in phase by a half cycle of the carrier wave frequency, and
wherein the reset signal receiving unit changes the first carrier wave into a first value and the second carrier wave into a second value when the reset signal is input.

10. A control method of a power conversion device, comprising:
calculating a voltage command value that is a command value of an AC voltage to be applied to a rotary electric machine that is driven by a power conversion device;
generating a carrier wave;
generating a pulse signal that is supplied to the power conversion device on the basis of a comparison result between the voltage command value and the carrier wave; and
changing a value of the carrier wave into a predetermined value when a predetermined reset signal is input;
wherein the AC voltage is a three-phase AC voltage, and
wherein the carrier wave generator changes each of the carrier waves of three phases into the predetermined value at different timing on the basis of the reset signals of three phases, each of which is different in phase by ⅓ cycle of the voltage command value.

* * * * *